United States Patent [19]

Bates, Jr.

[11] E Re. 31,105

[45] Reissued Dec. 21, 1982

[54] CONTROLLED PRESSURE DROP VALVE

[76] Inventor: Charles L. Bates, Jr., P.O. Box 100C, Springville, Utah 84663

[21] Appl. No.: 938,163

[22] Filed: Aug. 30, 1978

Related U.S. Patent Documents

Reissue of:

[64] Patent No.: 3,977,435
Issued: Aug. 31, 1976
Appl. No.: 444,524
Filed: Feb. 21, 1974

[51] Int. Cl.[3] ..... F16K 47/08

[52] U.S. Cl. ..... 137/625.3; 137/625.33; 251/127; 138/42; 138/43

[58] Field of Search ..... 251/127, 205; 137/625.3, 625.48, 625.33; 138/42, 43

[56] References Cited

U.S. PATENT DOCUMENTS

| | | | |
|---|---|---|---|
| 540,270 | 6/1895 | Parker | 138/43 |
| 871,775 | 11/1907 | Blanchard et al. | 251/127 |
| 1,032,794 | 7/1912 | Wolf | 181/264 |
| 1,243,134 | 10/1917 | Binckley | 251/31 X |
| 1,342,955 | 6/1920 | Gebhardt | 251/333 |
| 2,008,722 | 7/1935 | McClintock | 138/43 |
| 2,021,079 | 11/1935 | Mittendorf et al. | 138/42 |
| 2,207,399 | 7/1940 | Gaertner | 210/83 |
| 2,722,942 | 11/1955 | Hencken | 251/118 |
| 2,887,127 | 5/1959 | Broadbent | 137/625.29 |
| 2,920,652 | 1/1960 | Rudelick et al. | 137/625.48 X |
| 2,939,672 | 6/1960 | Rich | 251/5 |
| 3,131,717 | 5/1964 | Gratzmuller | 251/127 X |
| 3,133,557 | 5/1964 | Gongiver | 137/512.1 |
| 3,199,540 | 8/1965 | Forster | 137/625.69 |
| 3,318,571 | 5/1967 | Jeffrey | 137/625.48 |
| 3,513,864 | 5/1970 | Self | 137/625.3 X |
| 3,588,037 | 6/1971 | Ritchie | 251/127 |
| 3,680,596 | 8/1972 | Pickett | 137/625.69 |
| 3,688,800 | 9/1972 | Hayner | 138/42 |
| 3,690,344 | 9/1972 | Brumm | 137/625.28 |
| 3,744,762 | 7/1973 | Schlicht | 138/42 X |
| 3,856,049 | 12/1974 | Scull | 138/42 |
| 3,894,716 | 7/1975 | Barb | 137/625.3 X |

FOREIGN PATENT DOCUMENTS

| | | | |
|---|---|---|---|
| 241182 | 9/1910 | Fed. Rep. of Germany | 251/333 |
| 1008977 | 5/1957 | Fed. Rep. of Germany | 137/625.3 |
| 32730A/71 | of 1971 | Italy | 137/625.37 |
| 107090 | 6/1917 | United Kingdom | 138/42 |
| 721859 | 1/1955 | United Kingdom | 138/42 |
| 949425 | 2/1964 | United Kingdom | 138/42 |
| 1220275 | 1/1971 | United Kingdom | 138/43 |

OTHER PUBLICATIONS

Contributions to the Practice of Noise Reduction in Industrial Plants-published by Assoc. of German Iron--Works Operators, 1964, Stahleisen M.B.H., Dusseldorf.

Technische Mitteilungen, Nov. 1962, pp. 526-535.

Advanced Valve Technology, by Kenneth D. May, Midwest Research Institute, Kansas City, Mo., Feb. 1965, pp. 18-21.

Mechanical Engineers' Handbook, edited by Lionel S. Marks, 5th Ed. (1951) p. 255.

*Primary Examiner*—Arnold Rosenthal

*Attorney, Agent, or Firm*—H. Ross Workman; Rick D. Nydegger

[57] ABSTRACT

A valve having stacked disks with alternate circular grooves in the faces thereof to provide a high pressure drop surface in fluid flow transverse to said grooves and ridges. The disks are circular in shape with a circular center opening to provide a central fluid opening when the disks are stacked with the center openings in register. Fluid enters the center opening and flows radially between the adjacent faces of a pair of disks to flow transversely across the continuous circular grooves and ridges.

13 Claims, 7 Drawing Figures

CONTROLLED PRESSURE DROP VALVE

Matter enclosed in heavy brackets [ ] appears in the original patent but forms no part of this reissue specification; matter printed in italics indicates the additions made by reissue.

BACKGROUND OF THE INVENTION

1. Field

The handling of high pressure fluids presents particular problems in any device in which substantial reduction of pressure occurs. High pressure liquids often cavitate within turbines, valves and the like, resulting in pitting of critical surfaces. Also, a rapid drop in pressure of a superatmospheric gas stream often results in inordinately loud noises as the gas approaches or exceeds sonic velocities. These problems can be overcome by gradually dropping the pressure by subjecting the fluid to a series of minor reductions in pressure, for example, by placing a number of orifices of decreasing orifice diameter in the fluid stream, or by subjecting the fluid to substantial conduit friction, for example, by passing the fluid through channels, passageways and the like having a very high wall-area to volume ratio.

2. State of the Art

The concept of utilizing narrow passageways in lieu of orifices to effect pressure reduction or to control fluid flow has been practiced in the art. The control of low volume fluid flow is illustrated by the device disclosed in U.S. Pat. No. 1,964,300 of Perry, et al. wherein a single, long-length passageway was utilized to control gas flow to a pilot burner.

In Mittendorf, et al., U.S. Pat. No. 2,021,079, a long-length, narrow passageway is utilized in a pressure reduction device. A single tortuous path is provided by grooving adjacent disks so that an interconnecting passageway is formed through a stack of disks.

The concept of utilizing a long passage has been further applied to axially actuated valves in which a plurality of tortuous paths are presented to a high pressure stream.

In U.S. Pat. No. 3,514,074 the fluid flow is subdivided into a plurality of individual streams in respective passageways having a long-length to diameter ratio, while in U.S. Pat. No. 3,513,864 the high pressure fluid flows a tortuous course through a skeletal, disk-baffle grid assembly. The devices described in both patents have adjacent disks having radial separators extending along the disk faces. At least some of the disks of the U.S. Pat. No. 3,513,864 are perforated, while disks of the U.S. Pat. No. 3,514,074 have furrows separated from one another by the face surfaces in sealing contact between adjacent furrows, the furrows changing direction of fluid flow substantially in a horizontal plane.

A single, narrow passageway cannot be effectively utilized to handle a high pressure stream having a high rate of flow. Furthermore, devices which utilize individual or discrete passages tend to plug whenever the fluid contains solid matter. While the devices of the prior art are effective for their intended purpose, an easily manufactured device for handling high pressure streams of large volumes does not exist.

SUMMARY OF THE INVENTION

The instant invention involves a valve having a valve housing with an interior accommodating a plurality of stacked disks having a central cylindrical fluid cavity formed by the central openings of respective disks in register. Adjacent disks are spaced apart a slight distance to form segregated, annular or ring-shaped cavities encircling said cylindrically shaped cavity. The fluid inlet and outlet of the ring-shaped segregated cavities is from substantially continuous peripheral spaces between adjacent disks. A linear actuated plunger within the central cylindrical cavity regulates the number of segregated, ring-shaped spaces formed by adjacent disks available for admission of fluid.

The transverse flow of fluid across the ridges and furrows of disk faces results in dissipation of fluid energy. The ridges and furrows are preferably concentric circles upon a disk face and adapted to coact with an adjacent disk face so that the furrow of one face is opposed by a ridge of an opposite face. The ridges may be spiral-shaped as long as a spiral-shaped furrow which mates therewith is in an opposite face of a disk.

BRIEF DESCRIPTION OF THE DRAWINGS

Further description of the invention may be facilitated by reference to the accompanying drawings.

DESCRIPTION OF THE PREFERRED EMBODIMENT

Figure 1:
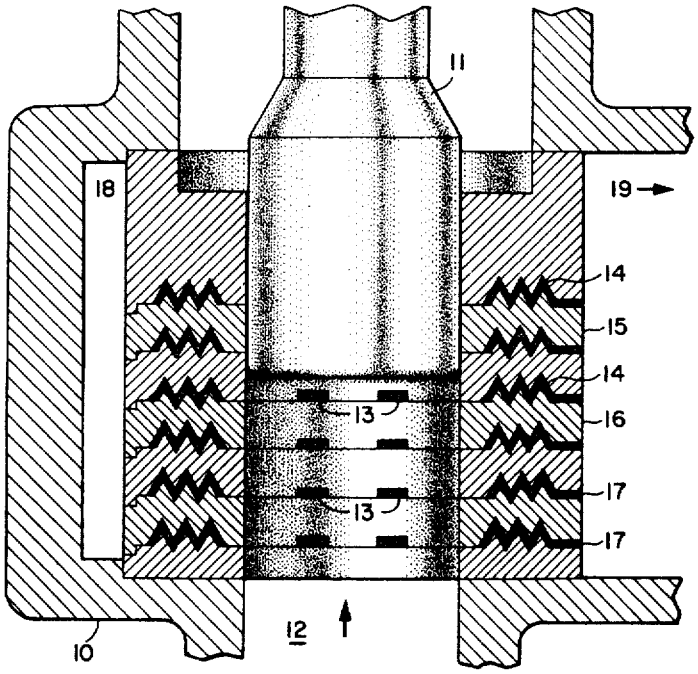
FIG. 1 is an elevational cross-sectional view of a valve having extended-surface stacked disks.

The valve of FIG. 1 comprises a valve body or housing 10 having therein a vertically actuated plunger 11 which travels within the central inlet cavity 12 to close serially the lateral inlet openings 13 to the extended-surface circular space 14 formed between stacked adjacent disks 15 and 16. A high pressure fluid flows into the cylindrical central inlet cavity 12 and into a plurality of lateral inlet openings 13 to flow into an extended-surface circular open space 14 between adjacent disks to then exit at the periphery of said disks through openings 17.

The fluid passing through a series of stacked disks exits through openings 17 into an enclosure 18 which substantially encircles the stacked disks except for the portion leading to discharge nozzle 19.

The novel valves of this invention comprise those having a plurality of novel disks described hereinafter. The number of disks, the spacing therebetween, the surface area of an individual disk and the particular surface configuration depends upon the size of the valve and the volume and pressure of fluid to be handled. The disks in an individual valve are preferably of the same interior and exterior diameter and preferably of a substantially identical construction. The disks are preferably placed in register, which is particularly necessary to provide a smooth central cavity 12 to accommodate a plunger 11 in a sealing manner so that fluid does not bypass the plunger.

The openings 13 between adjacent disks are preferably aligned vertically and preferably the total opening area at each level is uniform. The opening 13 between adjacent disks may be a continuous, narrow opening encircling the inner perimeter of the cavity between adjacent disks inasmuch as the disks may be spaced by supports at the outer periphery of said disk.

Figure 2:
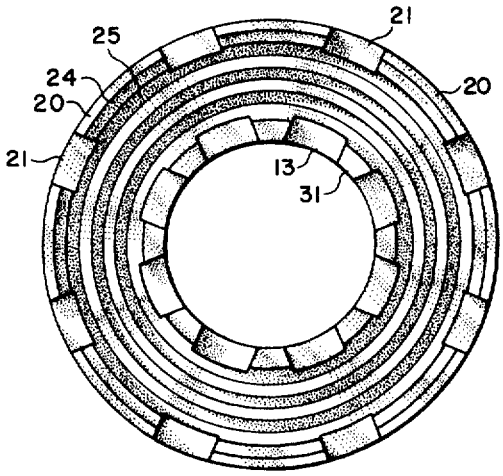
FIG. 2 is a plan view of one of an extended-surface disk.
Figure 3:
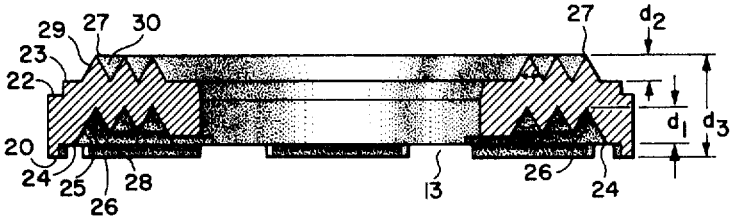
FIG. 3 is a cross-sectional view of the disk of FIG. 2 along section lines 3—3.
Figure 4:
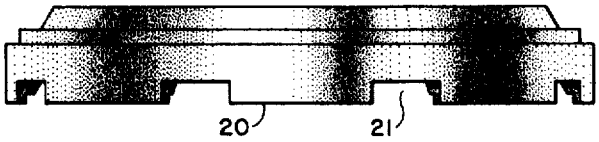
FIG.4 is an elevational view of the disk of FIG. 2.

A disk particularly useful in this invention is illustrated in FIGS. 2, 3 and 4. The disk nests with adjacent disks with the circular concentric ridges on the surface of one disk preferably directly opposite circular concentric grooves on the adjacent surface of another disk. The surfaces of adjacent disks, e.g., the upper surface of a lower disk and the lower surface of the next adjacent disk above the lower disk, preferably have parallel surfaces so that the annular space between the inlet opening and exit at the periphery of the disk has a height or thickness which is substantially uniform even though the annular space is defined by irregular, i.e., non-flat, surfaces.

The disk illustrated in FIGS. 2, 3 and 4 has a circular rim 20 at the periphery of the disk, which juts slightly below the lower surface of the disk. The disk, of course, can be inverted so that the rim juts above the upper surface. The terms "lower" and "upper" being in regard to the particular orientation in the drawings and not necessarily limiting the orientation of the disk in reference to any external reference plane. At spaced intervals about the periphery of the disk the circular rim 20 is interrupted with slots 21 which permit fluids to exit from the annular space between adjacent disk surfaces. The exit slots 21 may comprise most of the perimeter of a disk with the rim 20 comprising only a small portion, e.g., four small sections of rim spaced apart to form four supports on separating disks. The exit slots 21 are preferably located in line with entrance slots 13 which are located at the interior.

Circular rim 20 mates with circular ledge or shoulder 22 to interlock the disks against relative lateral movement and to space the opposed adjacent surfaces of a pair of mated disks to form open space 14. Annular surface 23 abuts surface 24 of an adjacent disk in the illustrated disk although the disk may be constructed so that these opposed surfaces are spaced apart. When surfaces 23 and 24 are in abutting contact, slot 21 is constructed so that it extends inwardly beyond surface 24 into inclined surface 25 of the outermost circular groove 26 which is directly opposed (in register) with circular ridge 27 of the next adjacent disk. The number of circular ridges on one surface of a disk is preferably equal to the number of circular grooves on the opposite surface.

A fluid flow space is provided between adjacent disks by spacing the walls 25 and 28 of circular groove 26 from the walls 29 and 30 of circular ridge 27 of an adjacent disk. In the illustrated embodiment, wall 25 is parallel to wall 29. The included angle of groove 26 is the same as the included angle of ridge 27. The included angle may range from an angle of about 150° to about 15°, although a preferred range is from about 120° to about 30° and particularly from about 90° to about 45°. The illustrated disks have ridges and grooves with an included angle of 60°.

The distance $d_1$ from annular surface 24 to the apex of groove 26 is slightly greater than the distance $d_2$ from upper annular surface 23 to the peak of circular ridge 27. Thus, a fluid flow space is provided between adjacent disks when surface 23 of one disk is in contact with surface 24 of another disk. The spacing between adjacent disks depends upon the number of disks required for a particular valve, the overall diameter of the disk, the width of the solid disk portion between the circular opening in the disk and its outer perimeter, and the number and angle of ridges and grooves.

In a typical disk having an overall diameter of about three inches and a central cavity diameter of about one and one-half inches, a vertical spacing between adjacent disks of about one-eighth to about one-sixteenth inch is generally sufficient to provide the desired resistance to flow. The overall thickness $d_3$ of a disk may vary substantially depending upon the depth of grooves provided and the height of the ridges provided. Depth $d_3$, however, for a valve having disks of the above dimensions, is typically from about one-fourth inch to about one inch and preferably from about three-eighths inches to about three-fourths inch.

FIG. 2 is a plan view of the lower surface of the disk illustrated in FIG. 3 showing rim 20 and slots 21 and 13. Between slots 13 there are pillars 31. As illustrated in FIG. 2, the width of slot 21 is the same as the width of slot 13, although either slot may be wider than the other and, in fact, pillars 31 may be eliminated so that slot 31 is a continuous circular opening. Also, slots 21 may comprise most of the perimeter of the disk with only a few narrow sections of rim 20 in position to space the disks apart and prevent lateral movement. Since rim 20 overlaps the mating surface of an adjacent disk, it spaces the disks vertically and also prevents relative lateral movement between disks. No pillars 31 need be provided between adjacent slots 13 for the structural purpose. Thus, the opening into the annular space between disks may be one continuous circular space.

Figure 5:
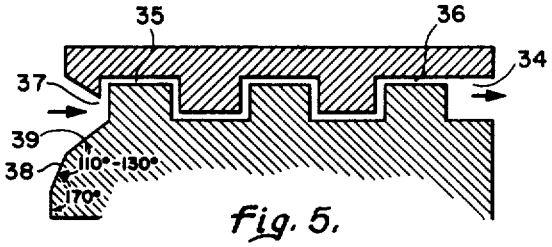
FIG. 5 is a sectional view of an extended-surface stacked disk having alternative forms of furrows and ridges.

The device illustrated in FIG. 5 illustrates another embodiment of the alternate concentric ridge and groove arrangement of the face of the stacked disk. The cross-sectional view illustrated in FIG. 5 shows ridges and valleys which are substantially square in cross-section; that is, tooth or ridge 32 has substantially parallel side walls 32a and 32b which meet a substantially flat circular surface 33 at substantially right angles. Valley 35 mates with ridge 32, although it has a slightly wider flat surface substantially parallel to ridge surface 32c. A disk having the ridge-valley arrangement of FIG. 5 provides one additional turn per ridge as compared with the arrangement illustrated in FIG. 3. The space between the opposed faces of adjacent disks in the device illustrated in FIG. 5 is substantially uniform.

An annular expansion chamber 34 is provided at the peripheral exit of the high pressure drop zone. The inlet 37 has a wide-mouth opening narrowing as it progresses to the high pressure drop zone. Surface 38 has a slight angle of about 5° to about 15° to the perpendicular to permit a more easily regulated flow to occur as the plunger moves past the surface 38. Surface 39 is disposed at an angle of about 45° to about 60° to the perpendicular.

Peripheral space 36 is, in essence, the exit zone of fluid from the pressure drop area. The fluid flows into annular space 34 and expands therein. The inner space 34 is provided as an intermediate expansion zone from which the gas then passes through exit ports into the surrounding conduit to further expand.

Figure 6:
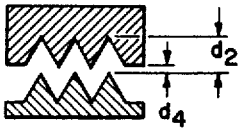
FIG. 6 is a sectional view of extended-surface stacked disks having vertically spaced opposed ridges and opposed furrows.

FIG. 6 is a cross-sectional view of a pair of opposed disks, each having concentric ridges which mesh with the ridges of the opposed disk. The crowns of the ridges of opposed disks in this embodiment are spaced apart by a distance $d_4$ which is substantially less than distance $d_2$ (depth of ridge) and is preferably not greater than about one-fourth the depth of $d_2$. If $d_4$ is too great, the transverse flow of fluid will not be forced to flow into the furrows between ridges. Distance $d_4$ may, of course, be zero and, as illustrated in FIGS. 1, 5 and 6, the ridges of one plate may project into the furrows of the opposed disk so that the ridges are overlapping.

Although the valves of this invention may be utilized to control fluid flow and reduce the pressure of high pressure fluid streams regardless of the type of fluid, i.e., liquid or gas, it is known that the volume of a gas increases as its pressure decreases. Therefore, a gas flowing in a conduit of uniform, cross-sectional area will experience a velocity increase as the pressure decreases. In order to avoid the acoustical annoyance of high velocity gases, it is preferred to size the valves of this invention so that the gas velocity does not exceed about 0.4 Mach at any point in the valve.

In order to maintain a substantially constant gas velocity throughout all spaces of the valves of this invention, the space between disks must increase as gas pressure decreases. Therefore, in valves constructed especially for handling gases, the spacing between faces of opposed disks is greater near the peripheral outlet than at the inlet from the central cylindrical cavity. The disks may be constructed with ridges and grooves or furrows of uniform depth with the spacing between opposed faces increasing with distance from the inlet to the space between disks. In this construction the volume of gases through the disk increases without an increase in ridge size. Thus, less of the gas may be forced to change direction as the gas nears the peripheral outlet. A preferred construction, however, increases the size of the ridges and furrows with distance from the inlet to the space between disks. Such a construction is illustrated in FIG. 7.

Figure 7:
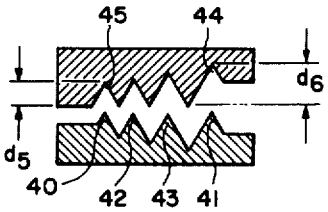
FIG. 7 is a sectional view of extended-surface stacked disks having the spacing therebetween increasing with distance from a central opening.

In FIG. 7 a disk especially suited for high pressure gases is illustrated in a cross-sectional view. As illustrated, the flow of gas proceeds through the space between disk faces from the cylindrical cavity 12 to discharge at the outer periphery of the disk. The ridges of the disk increase in depth as the gas passes from the inlet to the peripheral outlet. The first ridge 40 which the gas encounters is smaller in depth and surface area than ridge 41 which is located adjacent the peripheral outlet. The depth $d_6$ of ridge 41 is substantially greater than the depth $d_5$ of ridge 40. Ridges 42 and 43 interposed between ridges 40 and 41 are of a depth intermediate to ridges 40 and 41.

As illustrated in FIG. 7, as the size of ridges increase, the size of the furrows increases, consequently increasing the volume formed by the disks for a given radial distance. The space (area) between ridge 41 and its mating furrow 44 is substantially greater than the area between ridge 40 and furrow 45. For example, in a valve intended to control gas flow and reduce the gas pressure by about one-third, the area between the outermost ridge, i.e., the ridge adjacent the peripheral outlet and its mating furrow, should be about threefold the area between the innermost ridge, i.e., the ridge adjacent the gas inlet and its mating furrow.

In handling any fluid through the valves of the instant invention, it is preferred to achieve not more than a 50% drop in pressure across any given ridge, which generally involves about three changes in direction of fluid flow. Thus, in dropping the pressure of a fluid from about 1000 psi to less than 100 psi, a drop of not more than 500 psi would be taken across the first ridge the fluid encountered, a drop of not more than about 250 psi across the second ridge, a drop of not more than 125 psi taken across the third ridge, and drop of not more than about 62.5 psi across the fourth ridge would be taken.

The instant invention, through embodiments described herein, provides valves whereby the orifice effect is avoided and pressure is reduced through change of fluid direction and surface friction. Also, the discharge outlets from one pair of disks may be directly opposed to the opening from another pair of disks, thereby causing the fluid streams to impact one another, causing a further loss of energy. The fluid is caused to flow transversely across alternating ridges and grooves, thereby losing energy through a series of changes of direction. Also, the fluid path through the space between adjacent disks is sufficiently long to cause substantial loss of energy through friction.

In constructing disks for valves of the instant invention, it is preferred to provide a mated pair of disks which cause the fluid to change direction at least four times. Also, it is preferred that the spacing between disks be maintained such that the fluid velocity remains fairly low, for example, below about 0.4 Mach for gases and less than about 100 feet per second for liquids.

The novel valves of this invention enable the flow of high pressure fluids to be regulated without causing the fluid to attain high velocities. The fluid is introduced into one end of a cylindrical shaped cavity formed by the circular center holes of the stacked disks. The volume of the cavity available to the high pressure fluid is regulated by a plunger which is actuated along the central longitudinal axis of the cylindrical shaped cavity. The high pressure fluid in the cavity is radially discharged from said cavity into the segregated annular cavities encircling the central cylindrically shaped cavity. The number of annular cavities in any valve is generally one less than the number of disks present, since a pair of adjacent disks is required to form a single annular cavity. Each of the disks except the bottom and top disks has ridges on both faces.

The flow of fluid in the segregated annular cavities is substantially transverse to the ridges and furrows located in the faces of opposed disks forming the annular cavity. The transverse flow of fluid is substantially radial from the central cylindrical cavity and the discharge from the segregated annular cavities is substantially radial into a space formed by the valve body which encloses the stacked disks except for the discharge opening from the valve body.

The direction of fluid flow within the segregated cavities is changed a sufficient number of times, usually at least four times, to cause a substantial pressure drop to occur in the high pressure fluid. In a vertically aligned valve, i.e., one where the plunger moves vertically, the change of direction of fluid flow occurs substantially in a vertical plane, i.e., a molecule of fluid entering the segregated cavity flows radially along a line from the central cylindrical cavity with only a vertical movement component and without any component horizontally transverse to the radial flow component.

As indicated herein, the gases undergoing a reduction of pressure tend to expand. The disk illustrated in FIG. 7 is designed especially to accommodate this characteristic of gases. It is a significant feature of the valves of this invention that the annular segregated cavity formed by the opposed faces of a pair of disks inherently provides a larger cavity volume as the gas or other fluid travels from the inlet to the outlet of a segregated cavity. Since each annular cavity has a larger circumference near the outlet than at the inlet, the circumferential area between disks at the outlet is substantially larger than the circumferential area near the inlet. This is a feature not present in devices which cause a fluid to flow in an elongated tunnel.

Another significant feature of the valves of the instant invention is the uncomplicated construction of the individual disks. Valves for handling high pressure fluid generally require fairly accurate control. Thus, the surfaces of the various components are usually machined. The machining of concentric grooves, which is the preferred construction, in a circular disk face is readily accomplished on a lathe. Because of the ease of machining the disk faces on a lathe, the tolerances between disks may be maintained to a high degree. Thus, in a set of stacked disks, the volume of each segregated cavity will be substantially the same, thereby providing predicable operation.

The construction of the valves of the instant invention is further advantageous inasmuch as plugging by foreign material is less likely to occur in a segregated, annular cavity than in an elongated, narrow tunnel. Also, the valves may be rapidly constructed since no horizontal or radial alignment of one disk to another is required. The disks must be stacked vertically in register, but the overlapping rim automatically provides for this. Otherwise, the disks may be rotated with respect to one another without affecting the operation of the valve.

Although the instant invention has been described herein by reference to specific embodiments, it is not intended for the invention to be limited solely thereto, but to include all the variations and modifications within the scope of the appended claims.

I claim:

[1. A valve for high pressure fluids having a vertically actuated plunger and a valve wall coacting with said plunger to form a seal therebetween, said valve wall comprising a series of stacked annular disks, having fluid flow across said disks, an annular center opening in each disk in register with the annular openings of the remaining disks to provide a cylindrical cavity to accommodate said plunger and provide a fluid inlet, each disk having a plurality of substantially circular ridges on at least one face of said disk for changing direction of fluid flow, said ridges having a V-shaped cross-section and each disk having a plurality of projections on at least one surface of said disk to space each disk from adjacent disks and a substantial opening about the inside periphery of each disk communicating with the space between said disk and an adjacent disk and a substantial opening about the outside periphery of each disk communicating with the space between said disk and an adjacent disk and communicating with a discharge outlet of said valve.]

2. The valve of claim [1] *13* wherein a pair of adjacent disks have opposed faces having concentric ridges on face and mating concentric grooves on the opposite face.

3. The valve of claim [1] *2* wherein each disk has V-shaped concentric grooves and inverse V-shaped concentric ridges interspersed between adjacent grooves.

4. The valve of claim [1] *13* wherein a pair of adjacent disks forms between opposed faces thereof an annular, continuous space having an irregular radial cross-section.

5. The valve of claim [1] *13* wherein a pair of adjacent disks forms between opposed faces of an annular, continuous space of thin, radial cross-section having undulating, opposed, extensive surfaces.

6. The valve of claim [2] *13* wherein [concentric] *said* circular ridges each have a single continuous sharp edge.

7. The valve of claim [1] *13* wherein the plurality of projections are located on one surface of each disk adjacent the outer peripheral surface of said disk.

8. The valve of claim 2 wherein the ridges of one disk project into the grooves of an adjacent disk.

9. The valve of claim [1] *13* wherein the ridges of said disk have crowns which are in the same plane.

10. The valve of claim [1] *13* wherein a pair of adjacent disks have opposed faces having concentric ridges and concentric grooves on one face and mating concentric grooves and concentric ridges on the opposite face, the crowns of the ridges of each face being in substantially the same plane.

11. The valve of claim [1] *3* wherein the depth of said V-shaped grooves increases from the innermost to the outermost groove and the height of said V-shaped ridges increases from the innermost to the outermost ridge.

[12. The valve of claim 1 wherein the outer peripheral projections on said disk spaces said disk from another disk and overlaps the rim of an adjacent disk to prevent lateral movement thereof.]

*13. A valve for high pressure fluids comprising:*

*a valve housing;*

*a plunger; and*

*a plurality of stacked annular disks mounted within said housing, each said disk comprising:*

*an annular center opening in register with the annular center openings of the remaining disks, said annular center openings together providing a cylindrical cavity that accommodates reciprocating movement of said plunger so as to control the flow of fluid through said stacked disks;*

*a plurality of substantially circular ridges on at least one face of each said disk;*

*a plurality of projections on at least one face of each said disk, said projections overlapping the rim of an adjacent disk in order to prevent lateral movement thereof, said projections also spacing the disk from an adjacent disk so as to permit fluid flow therebetween;*

*a first substantial opening about the inside periphery of each said disk, said first opening communicating with the space between the disk and an adjacent disk; and*

*a second substantial opening about the outside periphery of each said disk, said second opening communicating with (1) said space between the disk and an adjacent disk and (2) a discharge outlet of said valve.*

*14. A valve for high pressure fluids comprising:*

*a valve housing;*

*a plunger; and*

*a plurality of stacked annular disks mounted within said housing, each said disk comprising:*

*an annular center opening in register with the annular center openings of the remaining disks, said annular center openings together providing a cylindrical cavity that accommodates reciprocating movement of said plunger so as to control the flow of fluid through said stacked disks;*

*a plurality of substantially circular ridges on at least one face of each said disk and a plurality of mating circular grooves on the opposite face of an adjacent disk, the depth of said grooves increasing from the innermost to the outermost groove and the height of said ridges increasing from the innermost to the outermost ridge;*

*a plurality of projections on at least one face of each said disk so as to space each disk from an adjacent disk in order to permit fluid flow therebetween;*

*a first substantial opening about the inside periphery of each said disk, said first opening communicating with the space between said disk and an adjacent disk; and*

*a second substantial opening about the outside periphery of each said disk, said second opening communicating with (1) the space between said disk and an adjacent disk and (2) a discharge outlet of said valve.*

*15. A valve for high pressure fluids comprising:*

*a valve housing;*

*a plunger; and*

*a plurality of stacked annular disks mounted within said housing, each said disk comprising:*

*an annular center opening in register with the annular center openings of the remaining disks, said annular center openings together providing a cylindrical cavity that accommodates reciprocating movement of said plunger so as to control the flow of fluid through said stacked disks;*

*a plurality of substantially circular ridges on at least one face of each said disk and a plurality of mating circular grooves on the opposite face of an adjacent disk, the depth of said grooves increasing from the innermost to the outermost groove and the height of said ridges increasing from the innermost to the outermost ridge;*

*a plurality of projections on at least one face of each said disk, said projections overlapping the rim of an adjacent disk in order to prevent lateral movement thereof, said projections also spacing the disk from an adjacent disk so as to permit fluid flow therebetween;*

*a first substantial opening about the inside periphery of each disk, said first opening communicating with the space between said disk and an adjacent disk; and*

*a second substantial opening about the outside periphery of each said disk, said second opening communicating with (1) the space between said disk and an adjacent disk and (2) a discharge outlet of said valve.*

* * * * *